US005626056A

United States Patent [19]
Owens

[11] Patent Number: 5,626,056
[45] Date of Patent: May 6, 1997

[54] HYDRAULICALLY OPERATED TRASNMISSION FOR LAND VEHICLE

[76] Inventor: Kevin M. Owens, 115 S. Lois Ave., Tampa, Fla. 33614

[21] Appl. No.: 414,447

[22] Filed: Mar. 31, 1995

[51] Int. Cl.⁶ .................................................. F16H 3/08
[52] U.S. Cl. ................................... 74/333; 192/4 A
[58] Field of Search .............................. 192/4 A; 74/325, 74/333, 364

[56] References Cited

U.S. PATENT DOCUMENTS

| | | | |
|---|---|---|---|
| 1,199,640 | 9/1916 | Vincent | 74/364 |
| 1,661,613 | 3/1928 | Jackson | 74/364 |
| 1,748,827 | 2/1930 | Boltshauser | 192/88 A |
| 1,984,556 | 12/1934 | Vetter | 74/364 |
| 2,055,970 | 9/1936 | Fippard | 74/364 |
| 2,320,960 | 6/1943 | Wheaton | 74/364 |
| 2,430,799 | 11/1947 | Aspinwall | 74/364 |
| 2,511,039 | 6/1950 | Black et al. | 74/364 |
| 2,596,700 | 5/1952 | Lapsley | 74/364 |
| 3,400,601 | 9/1968 | Ruhl et al. | 74/364 |
| 3,460,656 | 8/1969 | Swanson | 192/48.5 |
| 4,934,490 | 6/1990 | Chang | 192/4 A |
| 5,180,038 | 1/1993 | Arnold et al. | 192/4 A |
| 5,307,914 | 5/1994 | Elijah | 192/87.13 |

OTHER PUBLICATIONS

Transmission Manual pp. 11–2 to 11–6.
Transmission Manual pp. 22–37 to 22–47.
Transmission Gear and Case.

*Primary Examiner*—Dirk Wright
*Attorney, Agent, or Firm*—Frijouf, Rust & Pyle, P.A.

[57] ABSTRACT

An improved automatic transmission is disclosed comprising an input shaft, an output shaft and a countershaft with the input shaft rotating the countershaft. A plurality of countershaft gears are secured to the countershaft and are in rotational engagement with a plurality of drive gears rotatably mounted on the output shaft. A plurality of clutches are mounted between the output shaft and the drive gears for transferring rotational power from the input shaft to the output shaft upon engagement of a selected one of the plurality of clutches, respectively.

8 Claims, 14 Drawing Sheets

HYDRAULICALLY OPERATED TRASNMISSION FOR LAND VEHICLE

BACKGROUND OF THE INVENTION

1. Field of the Invention

This invention relates to land vehicles and more particularly to an improved automatic transmission capable of operating with a number of forward speeds and a reverse speed heretofore unknown in the art with increased efficiency.

2. Background of the Invention

Land vehicles such as automobiles, trucks and buses utilize a rotary power plant for rotating a plurality of drive wheels to propel the land vehicles. Typically, the rotary power plant is a fossil fuel engine such as a gasoline or diesel engine connected through a clutch and a transmission to the plurality of drive wheels. The clutch is required to connect and disconnect the rotating engine from the plurality of drive wheels to accommodate for the motion of the land vehicle. The transmission is required to connect the rotating engine to the plurality of drive wheels at various gear ratios to accommodate for the speed and torque required by the land vehicle.

Historically, manual clutches and manual transmissions were first used to connect the rotating engines to the plurality of drive wheels of the land vehicle. Three speed manual transmissions were used in land vehicles having large displacement fossil fuel engines, whereas four and five speed manual transmissions were used in high performance land vehicles and land vehicles having small displacement fossil fuel engines.

Subsequently, automatic transmissions were developed to connect the rotating engines to the plurality of drive wheels of the land vehicle. These automatic transmissions incorporated automatic clutches known as torque converters to connect the rotating engines to the plurality of drive wheels of the land vehicle. Three speed automatic transmissions were used in land vehicles having large displacement fossil fuel engines, whereas four speed manual transmissions were used in high performance land vehicles and land vehicles having small displacement fossil fuel engines.

U.S. Pat. No. 1,748,827 to Boltshauser discloses a fluid clutch comprising a shaft and a wheel-shaped member loosely mounted on the shaft and forming one clutch-half. A second clutch-half is rigidly connected to the shaft. At least one folded diaphragm is stiff in a radial direction and is attached to one of the clutch-halves. A friction disc is connected to each diaphragm and is attached substantially at its outer edge to the diaphragm to be suspended from the latter. Each friction disc extends from the hub of the wheel-shaped clutch member toward a periphery and forming a chamber with the diaphragm and with the clutch member for the reception of fluid under pressure. Fluid under pressure is supplied to the chambers to press the friction discs into contact with the clutch-half. The friction discs surround the hub of the wheel-shaped clutch member with an amount of clearance through which fluid supplied to the chambers is allowed to flow to the co-operating surfaces of the friction discs and the clutch-half to which the discs are not connected.

U.S. Pat. No. 3,460,656 to Swanson discloses a control for a propulsion system including a diesel engine and a gas turbine engine with a friction clutch for coupling the diesel to an output shaft and a synchronizing twin clutch for coupling the turbine to the shaft. A friction clutch reduces the turbine speed to that of an intermediate output shaft while the latter is driven by the diesel and then with a positive-locking toothed clutch engageable when the speeds are synchronized. The control includes means for actuating fluid operators for the three clutches, proximity sensors signaling full engagement and disengagement of the positive clutch, and speed sensors preventing engagement of the positive clutch before synchronization and for preventing return to diesel drive while the speed is above the proper diesel range. In addition, the control produces an automatic cycle during attempted engagement of the positive clutch including signaling of failure to engage in the proper manner due to interference between the clutch teeth, full disengagement of the positive clutch, controlled slipping of the synchronizing clutch to change the angular relation of the teeth, and initiation of another attempt to engage the positive clutch, repeating this cycle until the positive clutch is fully engaged and the diesel and synchronizing clutches can be disengaged.

U.S. Pat. No. 5,307,914 to Elijah discloses a control system for a drive train having a direct drive clutch, and a torque amplifier clutch includes a master control for alternating between direct drive and torque amplifier positions for actuation of the direct drive clutch and the torque amplifier clutch respectively. When the master control moves from its direct drive position to its torque amplifier position a first delay control keeps the direct drive clutch engaged until the torque amplifier clutch is fully engaged. When the master control moves from its torque amplifier position to its direct drive position a second delay control keeps the torque amplifier clutch engaged until the direct drive clutch is fully engaged.

Although the aforementioned patents have contributed to the automatic transmission art in many ways, these patents suffer from significant disadvantages and significant inefficiencies.

Therefore, it is an object of the present invention to provide an improved automatic transmission having a significant advancement in the automatic transmission art.

Another object of this invention is to provide an improved automatic transmission suitable for use in land vehicles having front wheel drive, rear wheel drive or four wheel drive.

Another object of this invention is to provide an improved automatic transmission capable of operating with a number of forward speeds and a reverse speed heretofore unknown in the art.

Another object of this invention is to provide an improved automatic transmission capable of operating with five forward speeds and a reverse speed.

Another object of this invention is to provide an improved automatic transmission incorporating a first, a second and a third hydraulically operated clutch for respectively engaging a first, a second and a third drive gear for transferring rotational power from a rotary power input and a rotary power output.

Another object of this invention is to provide an improved automatic transmission wherein each of the gears of the improved automatic transmission includes plural oppositely opposed gear teeth for eliminating backlash between gears.

Another object of this invention is to provide an improved automatic transmission contained within a first and a second housing portion with the first housing portion journalling an input shaft, an output shaft and a countershaft for easy maintenance and repair.

Another object of this invention is to provide an improved automatic transmission having an electrical transmission lock for locking an output shaft of the improved automatic transmission.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved automatic transmission for transferring rotational power from a rotary power input and a rotary power output. The improved automatic transmission comprises an input shaft connected to the rotary power input for receiving rotary power therefrom. An output shaft is connected to the rotary power output for transferring rotary power thereto. An input drive gear is secured to the input shaft and first, second and third drive gears are rotatably mounted to the output shaft. A countershaft having a countershaft gear is secured thereto for rotational engagement with the input drive gear of the input shaft for transferring rotational power from the input shaft to the countershaft. First, second and third countershaft gears are secured to the countershaft for rotational engagement with the first, second and third drive gears of the output shaft for transferring rotational power from the countershaft to the first, second and third drive gears, respectively. First, second and third clutches are mounted between the output shaft and the first, second and third drive gears for transferring rotational power from a selected one of the first, second and third drive gears to the output shaft upon engagement of a selected one of the first, second and third clutches, respectively. A control selectively engages one of the first, second and third clutches for transferring rotational power from the input shaft to the output shaft in accordance with the selected one of the first, second and third drive gears.

Preferably, the rotary power input is a rotary power plant of a land vehicle with the rotary power output comprising a drive wheel of the land vehicle. The first, second and third countershaft gears in rotational engagement with the first, second and third drive gears provide a first, a second and a third gear ratio between the input shaft and the output shaft.

The control comprises first, second and third electrically operated valves for controlling the flow of a hydraulic fluid to the first, second and third hydraulically operated clutches. The control selectively actuates one of the first, second and third electrically operated valves for supplying the hydraulic fluid to the selected one of the first, second and third hydraulically operated clutches. The control sequentially engages the first, second and third clutches for sequentially transferring rotational power from the input shaft to the output shaft in accordance with the first, second and third drive gears.

Preferably, the improved automatic transmission includes a reverse drive gear rotatably mounted to the output shaft. A reverse countershaft gear is secured to the countershaft for rotational engagement with the reverse drive gear of the output shaft for transferring reverse rotational power from the countershaft to the reverse drive gear. A reverse clutch is mounted between the output shaft and the reverse drive gear for transferring reverse rotational power from the input shaft to the output shaft upon engagement of the reverse clutches.

The improved automatic transmission may include a fourth and a fifth drive gear rotatably mounted to the output shaft. A fourth and fifth countershaft gear is secured to the countershaft for rotational engagement with the fourth and fifth drive gears of the output shaft for transferring rotational power from the countershaft to the fourth and fifth drive gears, respectively. A fourth and a fifth clutch is mounted between the output shaft and the fourth and fifth drive gears for transferring rotational power from the input shaft to the output shaft upon engagement of the fourth and fifth clutches, respectively.

In one embodiment of the invention, the improved automatic transmission includes a rotary park member secured to the output shaft with the rotary park member having a plurality of radially spaced voids. A blocking member is movable into engagement with one of the plurality of radially spaced voids for inhibiting rotation of the output shaft. Preferably, the blocking member is an electrically operated blocking member being movable into engagement with one of the plurality of radially spaced voids for inhibiting rotation of the output shaft.

In another embodiment of the invention, each of the first, second and third drive gears includes plural oppositely opposed gear teeth and each of the first, second and third countershaft gears includes plural oppositely opposed gear teeth for engaging with plural oppositely opposed gear teeth of the first, second and third drive gears, respectively, for eliminating backlash between the first, second and third drive gears and the first, second and third countershaft gears.

Preferably, the improved automatic transmission includes a housing for containing the input shaft, the output shaft and the countershaft. The housing comprises a first and a second housing portion with the first housing portion having input shaft journals, output shaft journals and countershaft journals for respectively journalling the input shaft, the output shaft and the countershaft.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
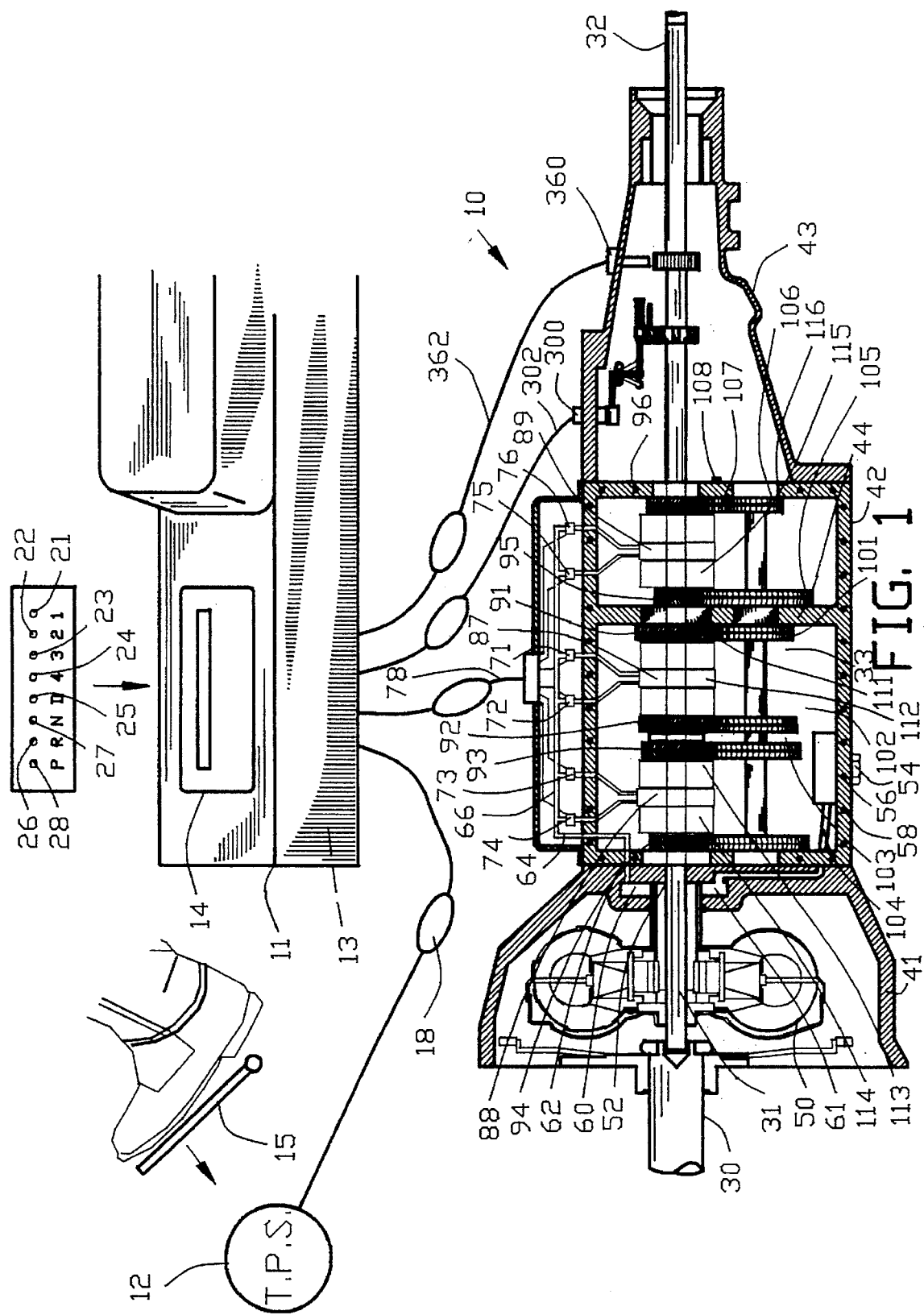
FIG. 1 is a side sectional view of the improved automatic transmission of the present invention connected to associated control devices.

FIG. 1 is a side sectional view of the improved automatic transmission 10 of the present invention connected to associated control devices including a shifting control 11, a throttle control sensor 12, a control system 13 and a display 14. The throttle control sensor 12 is connected to a throttle 15 for sensing the position of a throttle 15. The throttle control sensor 12 is connected by a connector 18 to the control system 13 for controlling the operation of the improved automatic transmission 10.

The shifting control 11 is shown as a plurality of display buttons 21–28 for displaying a first gear ratio display 1, a second gear ratio display 2, a third gear ratio display 3, a fourth gear ratio display 4, a fifth or drive gear ratio display D, a neutral position display N, a reverse gear ratio display R and a park position display P. The plurality of display buttons 21–28 are coincident with the displays 1–4, D, R, N and P and are connected to a control system 13 for controlling the selected gear ratio of the improved automatic transmission 10. Although the shifting control 11 is shown as a plurality of display buttons 21–28, it should be understood that the shifting control 11 may include a conventional column or console gear shift arm.

The improved automatic transmission 10 is disposed between a rotary power shaft 30 connected to a rotary power plant such as an internal combustion engine (not shown). The rotary power shaft 30 is connected to an input shaft 31. A rotary output shaft 32 is connected to a load such as the wheels of a vehicle (not shown). As will be described in greater detail hereinafter, the improved automatic transmission 10 controls the gear ratio between the rotary power shaft 30 and the rotary output shaft 32 through the input shaft 31 and a countershaft 33.

The improved automatic transmission 10 comprises a bell housing 41, a case housing 42 and a tail housing 43 being secured together by conventional means such as bolts or the like. The case housing 42 includes a plurality of internal supports 44 and 46. A conventional torque converter 50 is disposed within the bell housing 41 for connecting the rotary power shaft 30 to the input shaft 31. As should be well known to those skilled in the art, the torque converter 50 enables the connection of a rotating rotary power shaft 30 to a static of non-rotating input shaft 31 when the internal combustion engine (not shown) is operating and the wheels of a vehicle (not shown) are at rest.

The input shaft 31 extends into the case housing 42 through an aperture 52 having a suitable seal and suitable bearings. A filter 54 covers an input 56 of a fluid line 58 connected to an input 61 of a hydraulic pump 60. The hydraulic pump 60 may comprise a conventional gear pump operated by the rotation of the rotary power shaft 30. An output 62 of the hydraulic pump 60 is connected by a fluid line 64 to a manifold 66.

Figure 2:
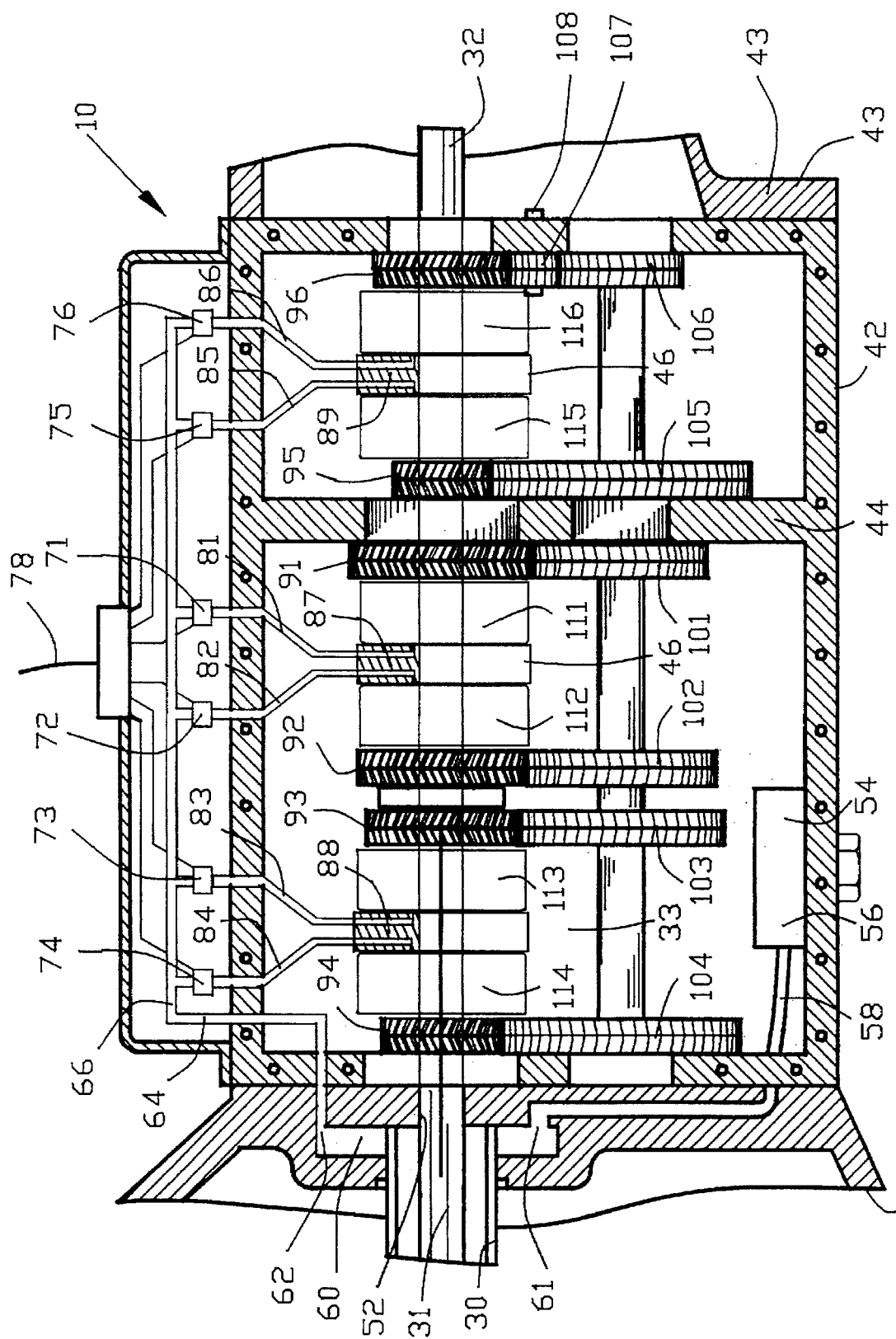
FIG. 2 is an enlarged view of a portion of FIG. 1.

FIG. 2 is an enlarged view of a portion of FIG. 1 illustrating a plurality of electrically operated valves 71–76 respectively connect the manifold 66 to a plurality of fluid conduits 81–86. Each of the plurality of electrically operated valves 71–76 are individually connected by electrical connectors 78 to the control system 13 for controlling the opening and closing of each of the plurality of electrically operated valves 71–76. Upon the opening of a selected one of the plurality of electrically operated valves 71–76, hydraulic fluid is pumped from the input 56 of the fluid line 58 by the hydraulic pump 60 and through the manifold 66 to flow through an associated one of the plurality of fluid conduits 81–86 to fluid stators 87–89. The fluid stators 87–89 are secured to the case housing 40 by supports 46.

A first through sixth drive gears 91–96 are disposed within the case housing 42. The first drive gear 91, the second drive gear 92, the third drive gear 93, the fifth drive gear 95 fifth and the sixth drive gears 96 are rotatably mounted to the output shaft 32. The fourth drive gear 94 is secured to the input shaft 31 for rotation therewith. The fourth drive gear 94 is also referred to as an input drive gear 94 whereas the sixth drive gear 96 is also referred to as a reverse drive gear 96. As will be described in greater detail hereinafter, the input shaft 31 is aligned with the output shaft 32 with the input shaft 31 being journalled to the output shaft 32 proximate to the fourth or input drive gear 94.

The countershaft 33 is supported by appropriate bearings on the supports 44 to be rotatably mounted in a parallel relation with the input shaft 31 and the output shaft 32. A first through sixth countershaft gear 101–106 are secured to the countershaft 33 for rotation therewith. The first through sixth countershaft gears 101–106 respectively engage with the first through sixth drive gears 91–96. The fourth countershaft gear 104 is positioned for rotational engagement with the fourth or input drive gear 94 of the input shaft 31 for transferring rotational power from the input shaft 31 to the countershaft 33.

Figure 3:
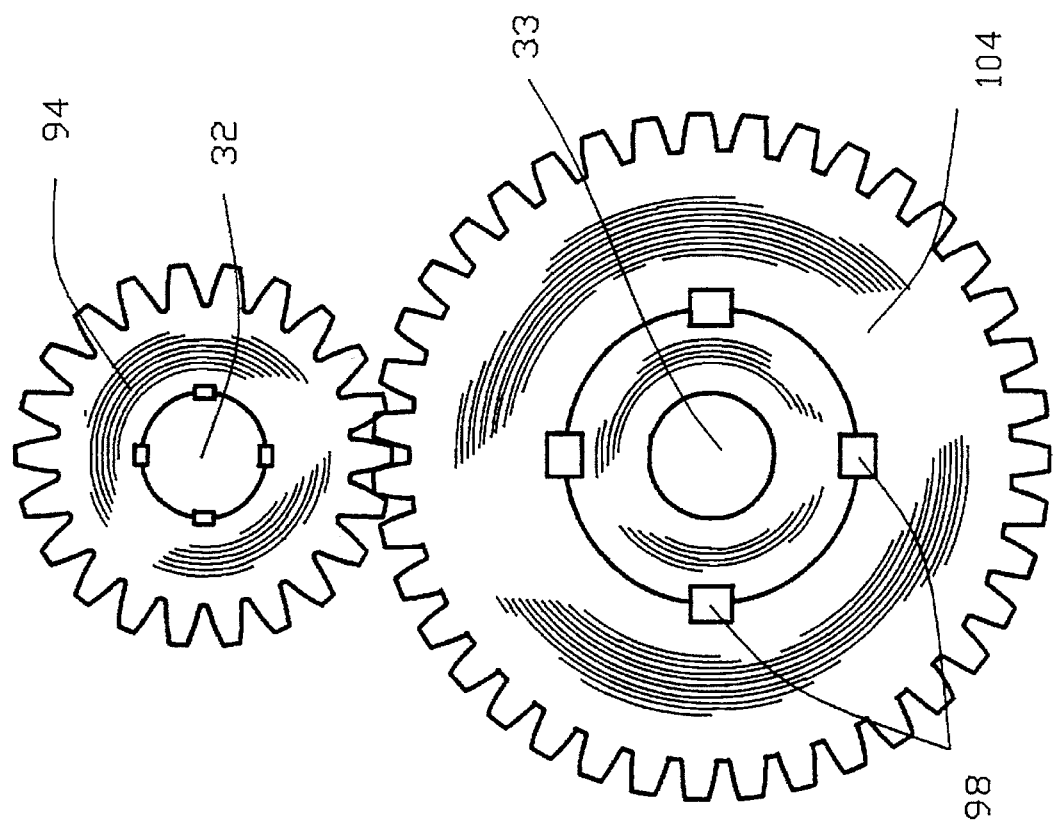
FIG. 3 is a sectional view along line 3—3 in FIG. 2.

FIG. 3 illustrates the engagement of the fourth or input drive gear 94 of the input shaft 31 with the fourth countershaft gear 104 of the countershaft 33 for transferring rotational power from the input shaft 31 to the countershaft 33. The fourth or input drive gear 94 is shown integrally secured to the input shaft 31 whereas the fourth countershaft gear 104 is shown secured to the countershaft by splines 98.

Figure 4:
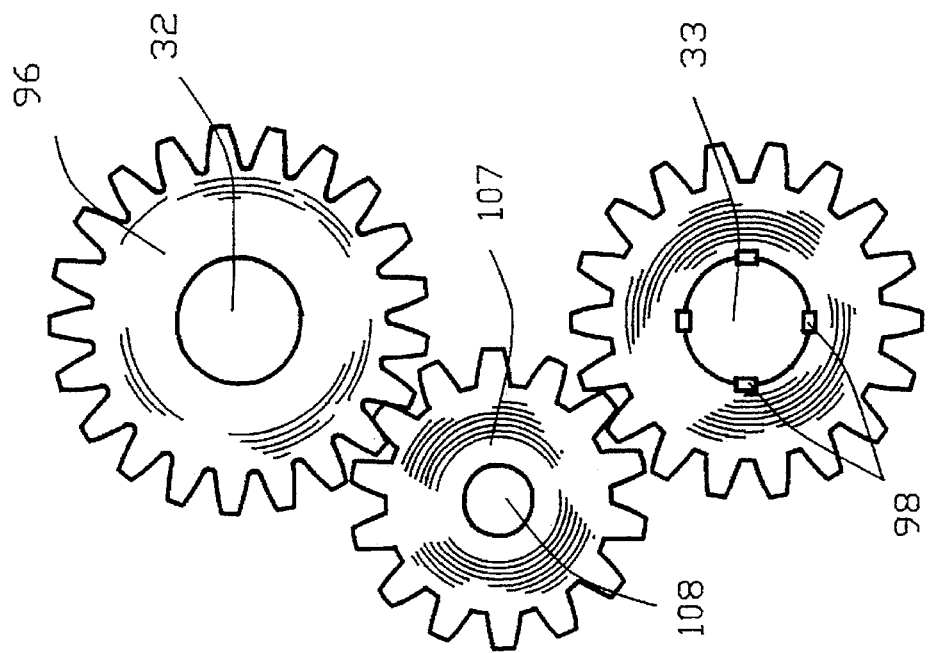
FIG. 4 is a sectional view along line 4—4 in FIG. 2.

FIG. 4, the second countershaft gear 102 is secured to the countershaft 33 for rotation therewith. The second countershaft gear 102 engages with the second drive gear 92 rotatably mounted to the output shaft 32. The first through sixth countershaft gears 101–105 are in respective engagement with the first through sixth drive gears 91–96. The rotational engagement of the first through sixth countershaft gears 101–106 with the first through sixth drive gears 91–96 enables the transfer of rotary power from the countershaft 33 to each of the first through sixth drive gears 91–96. The rotational engagement of the first through fifth countershaft gears 101–105 with the first through fifth drive gears 91–95 provide a first through fifth gear ratio between the input shaft 31 and the output shaft 32.

Figure 5:
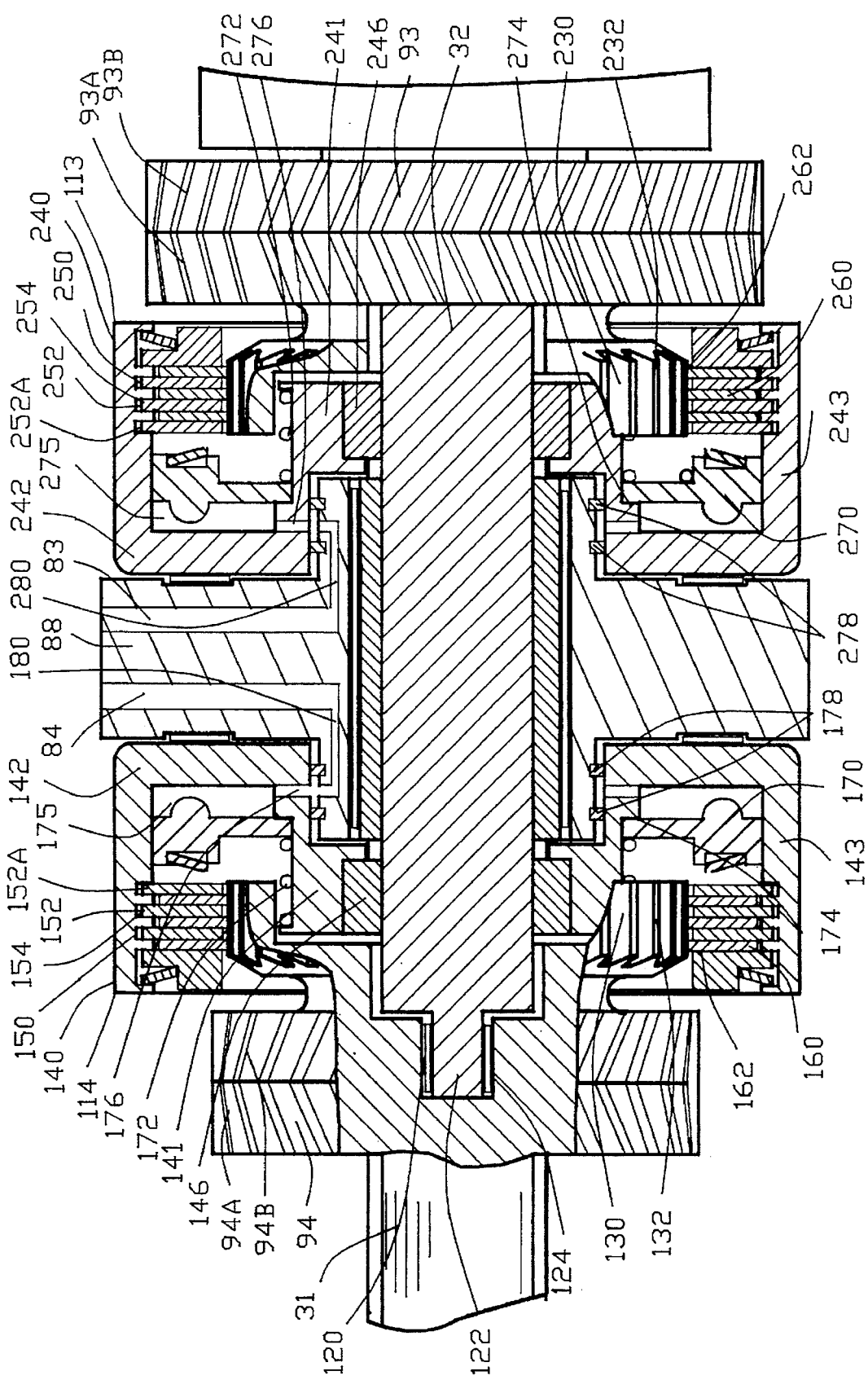
FIG. 5 is a sectional view along line 5—5 in FIG. 2.

As shown in FIG. 5, the rotational engagement of the sixth countershaft gear 106 with the sixth or reverse drive gear 96 is accomplished thorough an idler gear 107 rotatably mounted on a shaft 108 secured to the case housing 42. The rotational engagement of the sixth countershaft gear 106 with the sixth or reverse drive gear 96 through the idler gear 107 provide a reverse rotation of the output shaft 32 relative to the input shaft 31.

A first through sixth clutch 111–116 are mounted between the first through sixth drive gears 91–96 and the output shaft 32. As will be described in greater detail hereinafter, the first through sixth clutch 111–116 are hydraulically operated upon the application of fluid pressure from the fluid conduits 81–86. Upon the application of fluid pressure to a selected one of the clutch 111–116, the associated drive gear 91–96 transfers rotary power to the output shaft 32. The rotary power to the output shaft 32 from the application of fluid pressure to the selected one of the clutch 111–116 is in accordance with the gear ratio between the first through sixth drive gears 91–96 and the engaging countershaft gear 101–106.

Figure 6:
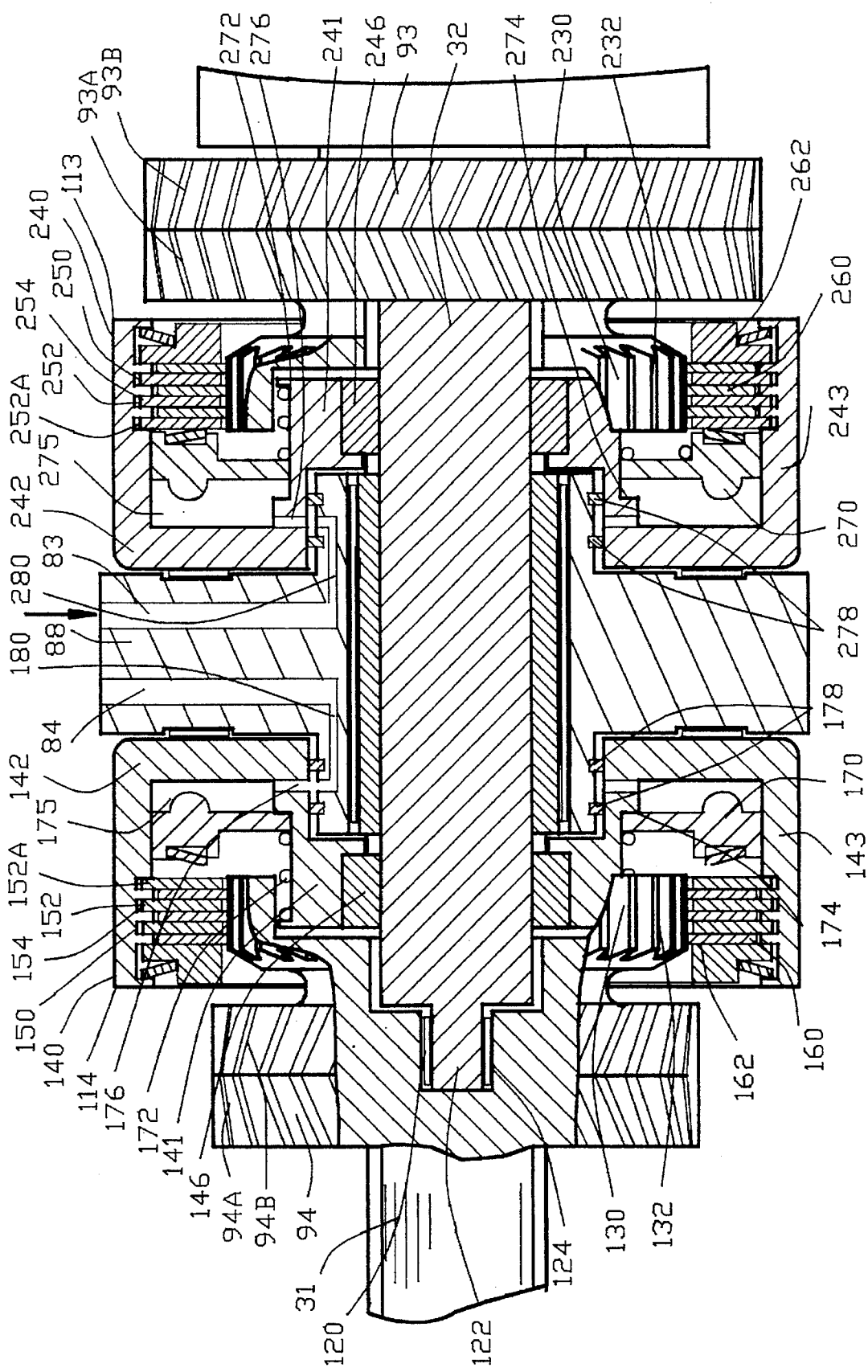
FIG. 6 is an enlarged sectional view of a portion of FIG. 2 illustrating plural clutches.

FIG. 6 is an enlarged sectional view of a portion of FIG. 2 illustrating the third clutch 113 and the fourth clutch 114 both in a non-engaging position. The fourth clutch is also referred to as an input clutch 114. The input shaft 31 includes a recess 120 for receiving a projection 122 extending from the output shaft 32. A roller bearing 124 journals the output shaft 32 relative to the input shaft 31.

The fourth or input drive gear 94 is integrally connected to a clutch gear 130 having clutch gear teeth 132 disposed within a clutch housing 140. The fourth or input drive gear 94 includes integral opposed teeth 94A and 94B for engaging with opposed teeth on the fourth countershaft gear 114. The engagement of opposed teeth 94A and 94B between the fourth or input drive gear 94 and the fourth countershaft gear 114 balances the torque between the fourth or input drive gear 94 and the fourth countershaft gear 114. In addition, the engagement of opposed teeth 94A and 94B between the fourth or input drive gear 94 and the fourth countershaft gear 114 reduces the noise of operation and increases the strength of the improved automatic transmission 10.

The clutch housing 140 includes a central region 141 with an integral sidewall 142 supporting a peripheral region 143. A spline 146 secures the central region 141 of the clutch housing 140 to the output shaft 32 thereby fixing the clutch housing 140 to the output shaft 32 for rotation therewith.

A plurality of keyways 150 are defined in the peripheral region 143 of the clutch housing 140. A plurality of key rings 152 are located within the clutch housing 140 with each of the plurality of key rings 152 having a key 154. Each of the plurality of keys 154 of the plurality of key rings 152 is located within the plurality of keyways 150 for preventing rotation of the plurality of key rings 152 relative to the clutch housing 140.

A plurality of gear rings 160 are located within the clutch housing 140 with each of the plurality of gear rings 160 having gear teeth 162. The gear teeth 162 of each of the plurality of gear rings 160 engage the clutch gear teeth 132 of the clutch gear 130 for preventing rotation of the plurality of gear rings 160 relative to the clutch gear 130 and the forth or input drive gear 94. The plurality of key rings 152 are interleaved with the plurality of gear rings 160 for enabling the plurality of key rings 152 to rotate relative to the plurality of gear rings 160.

A clutch piston 170 is slidably disposed within the clutch housing 140. A spring 172 urges the clutch piston 170 against a stop 174 defined by the clutch housing 140. The clutch piston 170 slidably engages with a key ring 152A against the urging of the spring 172 upon the introduction of fluid pressure within a fluid chamber 175 located within the clutch housing 140. A fluid chamber passage 176 extends from the fluid chamber 175 through the central region 141 of the clutch housing 140 and terminates in proximity to the output shaft 32. Plural rotary seals 178 extend from the fluid stator 88 for sealing with the central region 141 of the clutch housing 140. The fluid chamber passage 176 is aligned with a fluid passage 180 defined within the fluid stator 88 and in fluid communication with the fluid conduit 84.

The clutch piston 170 may be slidably moved into engagement with the key ring 152A whereat the plurality of key rings 152 are pressed against the interleaved plurality of gear rings 160 to prevent rotation of the plurality of key rings 152 relative to the plurality of gear rings 160. When the clutch piston 170 is disposed against the stop 174, the plurality of key rings 152 rotate relative to the plurality of gear rings 160 and the fourth or input clutch 114 is disengaged enabling the fourth or input drive gear 94 to rotate relative to the output shaft 32. When the clutch piston 170 is pressed against the key ring 152A, the plurality of key rings 152 move in accordance with the plurality of gear rings 160 and the fourth or input clutch 114 is engaged enabling the fourth or input drive gear 94 to rotate the output shaft 32.

In a similar manner, the third drive gear 93 and the third clutch 113 are shown in a non-engaging position. The third gear 93 is integrally connected to a clutch gear 230 having clutch gear teeth 232 disposed within a clutch housing 240. The third drive gear 93 includes integral opposed teeth 93A and 93B for engaging with opposed teeth on the third countershaft gear 113 for balancing the torque therebetween and for reducing the noise of operation and increasing the strength of the improved automatic transmission 10.

The clutch housing 240 includes a central region 241 with an integral sidewall 242 supporting a peripheral region 243. A spline 246 secures the central region 241 of the clutch housing 240 to the output shaft 32 thereby fixing the clutch housing 240 to the output shaft 32 for rotation therewith.

A plurality of keyways 250 are defined in the peripheral region 243 of the clutch housing 240. A plurality of key rings 252 are located within the clutch housing 240 with each of the plurality of key rings 252 having a key 254. Each of the plurality of keys 254 of the plurality of key rings 252 is located within the plurality of keyways 250 for preventing rotation of the plurality of key rings 252 relative to the clutch housing 240.

A plurality of gear rings 260 are located within the clutch housing 240 with each of the plurality of gear rings 260 having gear teeth 262. The gear teeth 262 of each of the plurality of gear rings 260 engage the clutch gear teeth 232 of the clutch gear 230 for preventing rotation of the plurality of gear rings 260 relative to the clutch gear 230 and the third drive gear 93. The plurality of key rings 252 are interleaved with the plurality of gear rings 260 for enabling the plurality of key rings 252 to rotate relative to the plurality of gear rings 260.

A clutch piston 270 is slidably disposed within the clutch housing 240. A spring 272 urges the clutch piston 270 against a stop 274 defined by the clutch housing 240. The clutch piston 270 slidably engages with a key ring 252A against the urging of the spring 272 upon the introduction of fluid pressure within a fluid chamber 275 located within the clutch housing 240. A fluid chamber passage 276 extends from the fluid chamber 275 through the central region 241 of the clutch housing 140 and terminates in proximity to the output shaft 32. Plural rotary seals 278 extend from the fluid stator 88 for sealing with the central region 241 of the clutch housing 240. The fluid chamber passage 276 is aligned with a fluid passage 280 defined within the fluid stator 88 and in fluid communication with the fluid conduit 83.

The clutch piston 270 may be slidably moved into engagement with a key ring 252A, whereat the plurality of key rings 252 are pressed against the interleaved plurality of gear rings 260 to prevent rotation of the plurality of key rings 252 relative to the plurality of gear rings 260. When the clutch piston 270 is disposed against the stop 274, the plurality of key rings 252 rotate relative to the plurality of gear rings 260 and the third clutch 113 is disengaged enabling the third drive gear 93 to rotate relative to the output shaft 32. When the clutch piston 270 is pressed against the key ring 252A, the plurality of key rings 252 move in accordance with the plurality of gear rings 260 and the third clutch 113 is engaged enabling the third drive gear 93 to rotate the output shaft 32.

As shown in FIG. 2, the fluid stators 87 and 89 are identical to the fluid stator 88 heretofore described. The fluid conduit 81-86 are respectively connected to the clutches 111-114 for controlling the engagement and disengagement of the respective clutches 111-114.

The plurality of electrically operated valves 71-76 respectively connect the manifold 66 to a plurality of fluid conduits 81-86. Each of the plurality of electrically operated valves 71-76 are individually connected by electrical connectors to the control system 13 for controlling the opening and closing of each of the plurality of electrically operated valves 71-76. Upon the opening of a selected one of the plurality of electrically operated valves 71-76, hydraulic fluid is pumped from the input 56 of the fluid line 58 by the hydraulic pump 60 and through the manifold 66 to flow through an associated one of the plurality of fluid conduits 80-85 to fluid stators 87-89 for controlling the engagement and disengagement of the respective clutches 111-114.

Figure 7:
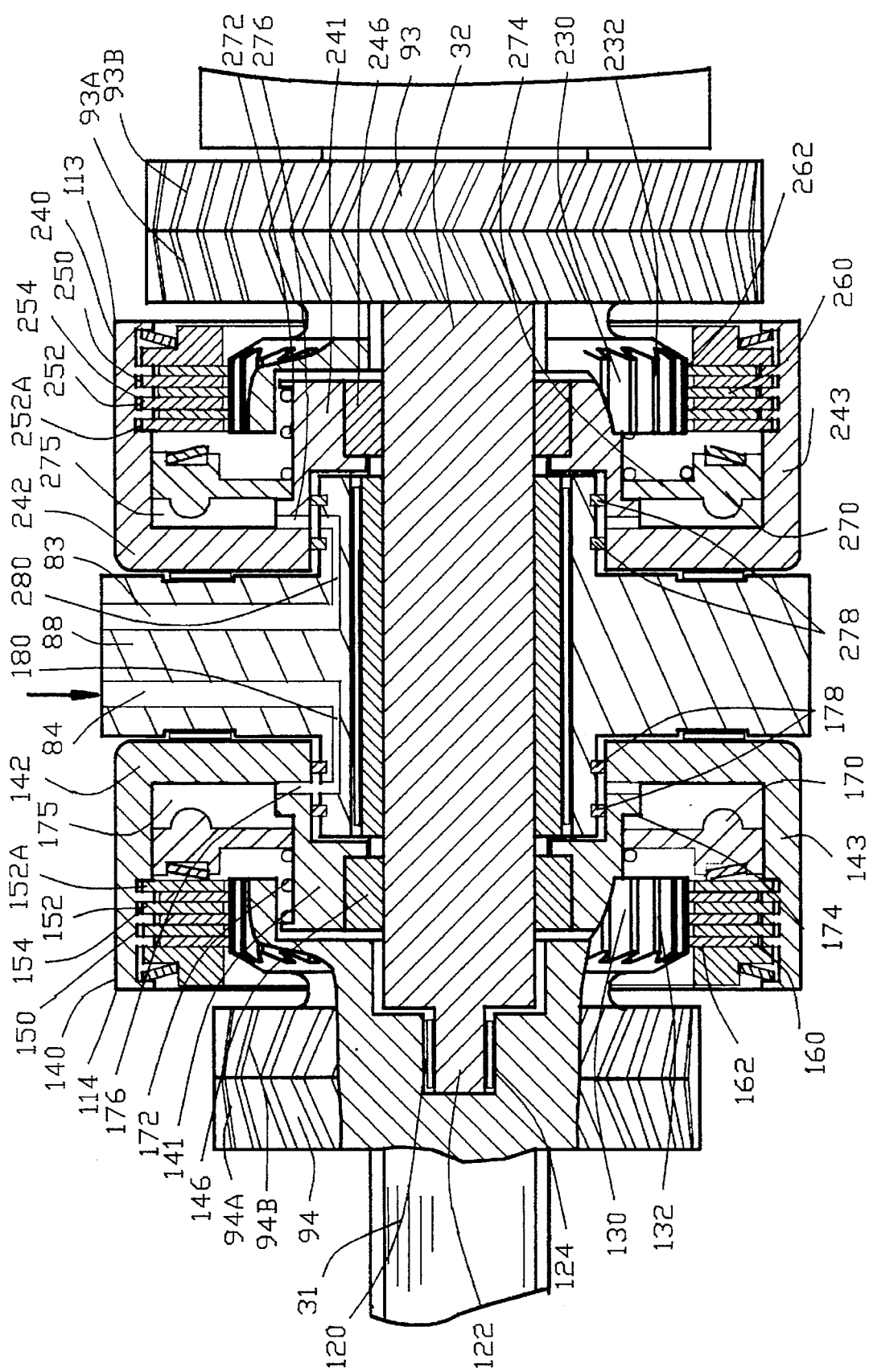
FIG. 7 is sectional view similar to FIG. 6 illustrating the engagement of one of the plural clutches.

FIG. 7 is sectional view similar to FIG. 6 illustrating the engagement of the clutch 113 and the disengagement of the clutch 114. Upon the opening of the electrically operated valve 73, hydraulic fluid is pumped from the input 56 of the fluid line 58 by the hydraulic pump 60 and through the manifold 66 to flow through the fluid conduit 83 to the fluid passage 280. The hydraulic fluid flows between the plural rotary seals 278 through the fluid chamber passage 276 into the fluid chamber 275.

The hydraulic fluid presses the clutch piston 270 against the key ring 252A to press the plurality of key rings 252 against the interleaved plurality of gear rings 260 to prevent rotation of the plurality of key rings 252 relative to the plurality of gear rings 260. The friction between the plurality of key rings 252 and the plurality of gear rings 260 engage the third clutch 113 for enabling the third drive gear 93 to rotate the output shaft 32.

Figure 8:
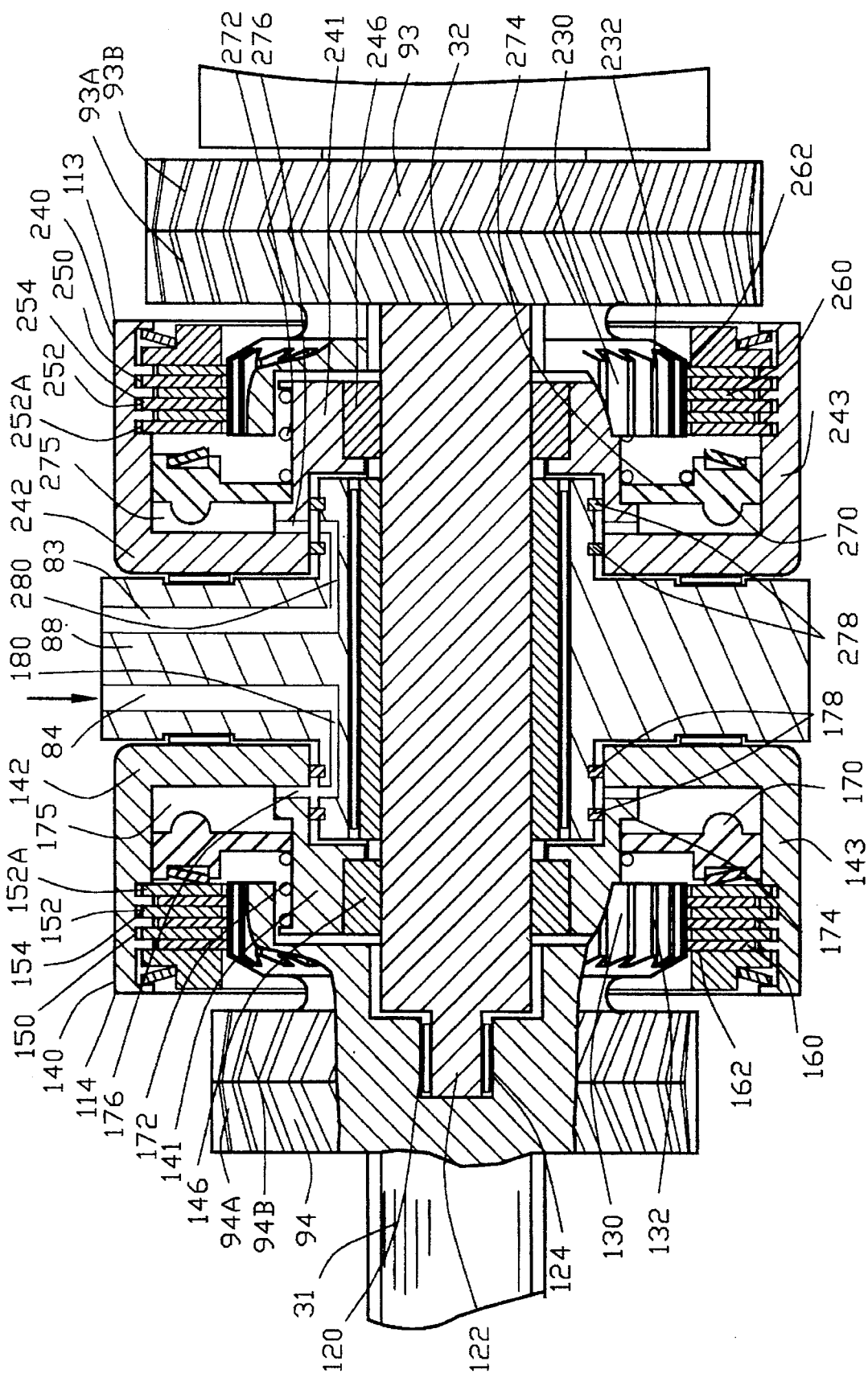
FIG. 8 is sectional view similar to FIG. 6 illustrating the engagement of the other of the plural clutches.

FIG. 8 is sectional view similar to FIG. 6 illustrating the engagement of the clutch 114 and the disengagement of the clutch 113. Upon the opening of the electrically operated valve 74, hydraulic fluid is pumped from the input 56 of the fluid line 58 by the hydraulic pump 60 and through the manifold 66 to flow through the fluid conduit 84 to the fluid passage 180. The hydraulic fluid flows between the plural rotary seals 178 through the fluid chamber passage 176 into the fluid chamber 175.

The hydraulic fluid presses the clutch piston 170 against the key ring 152A to press the plurality of key rings 152 against the interleaved plurality of gear rings 160 to prevent rotation of the plurality of key rings 152 relative to the plurality of gear rings 160. The friction between the plurality of key rings 152 and the plurality of gear rings 160 engage the fourth clutch 114 for enabling the fourth drive gear 94 to rotate the output shaft 32.

Figure 10:
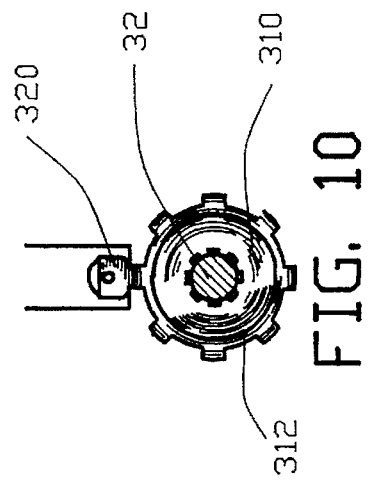
FIG. 10 is a sectional view along line 10—10 in FIG. 9.
Figure 12:
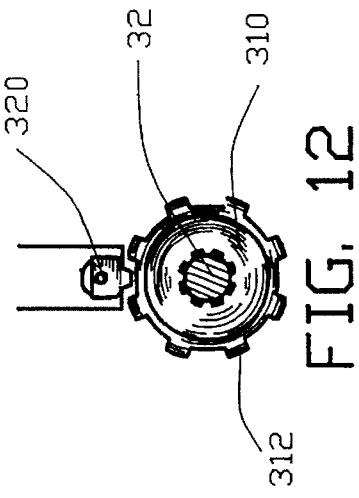
FIG. 12 is a sectional view along line 12—12 in FIG. 11.
Figure 9:
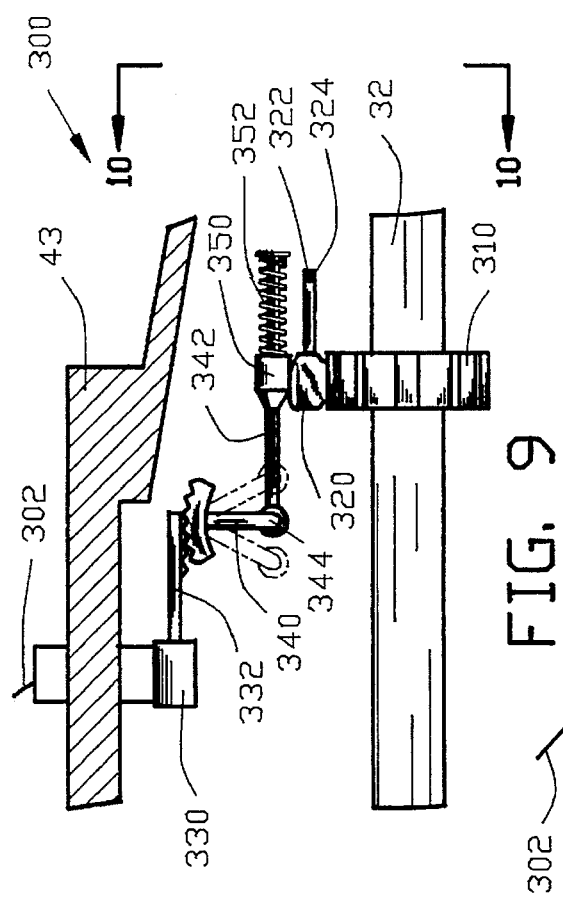
FIG. 9 is an enlarged view of a portion of FIG. 1 illustrating a park assembly in a non-interrupting position.
Figure 11:
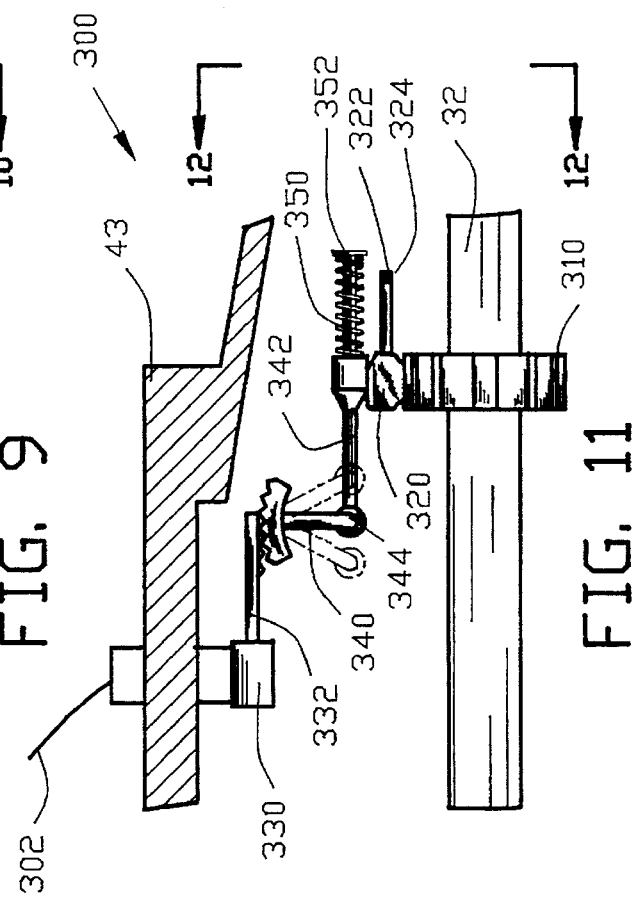
FIG. 11 is a view similar to FIG. 9 illustrating the park assembly in an interrupting position.

FIGS. 9 and 10 are enlarged views of a portion of FIG. 1 illustrating a park assembly 300 in a non-interrupting position for enabling rotation of the output shaft 32. FIGS. 11 and 12 are views similar to FIGS. 9 and 10 illustrating a park assembly 300 in an interrupting position for inhibiting rotation of the output shaft 32.

The park assembly 300 is connected by a connector 302 to the control system 13 for controlling the operation of the park assembly 300. The park assembly 300 comprises a park gear 310 secured to the output shaft 32 having a plurality of voids 312. A blocking member 320 is mounted on a pivot 322 for movement between the non-interrupting position shown in FIGS. 9 and 10 and the interrupting position shown in FIGS. 9 and 10. The blocking member 320 is biased into the non-interrupting position shown in FIGS. 9 and 10 by a spring 324.

A rotary actuator 330 is secured to the tail housing 43 and is connected by the connector 302 to the control system 13. The rotary actuator 330 rotates a worm gear 332 in accordance with a signal from the control system 13. The worm gear 332 engages teeth are defined in one end of a pivot actuator 340 with a stem 342 being pivotably mounted to the other end of the pivot actuator 340 by a pivot pin 344. A bar actuator 350 is slidably mounted in the stem 342 with a spring 352 biasing the bar actuator 350 into an extending position as shown in FIG. 9.

During normal operation of the improved automatic transmission 10, the control system 13 rotates the rotary actuator 330 into the position shown in FIGS. 9 and 10. When an operator desires to place the improved automatic transmission 10 into a park condition, the operator activates the display button 28 of the shifting control 11 whereupon the control system 13 rotates the rotary actuator 330 into the position shown in FIGS. 11 and 12. The rotary actuator 330 rotates the worm gear 332 to pivot the pivot actuator 340 and to longitudinally move the stem 342. The longitudinal movement of the stem 342 pivots the blocking member 320 into one of the plurality of voids 312 of the park gear 310. When the blocking member 320 is disposed within one of the plurality of voids 312 of the park gear 310, the park assembly 300 is in an interrupting position for inhibiting rotation of the output shaft 32. In the event that one of the plurality of voids 312 of the park gear 310 is not aligned with the blocking member 320, the blocking member 320 is biased into engagement with the side surface of the park gear 310 by the spring 352. Upon a slight rotation of the output shaft 32 due to a slight movement of the vehicle, one of the plurality of voids 312 of the park gear 310 will aligned with the blocking member 320 and the spring 352 will move the blocking member 320 within one of the plurality of voids 312 of the park gear 310 for inhibiting rotation of the output shaft 32.

The improved automatic transmission 10 controls the gear ratio between the rotary power shaft 30 and the rotary output shaft 32 through the input shaft 31 and a countershaft 33. The rotational engagement of the first through fifth countershaft gears 101–105 with the first through fifth drive gears 91–95 provide a first through fifth gear ratio between the input shaft 31 and the output shaft 32. The rotational engagement of the sixth countershaft gear 106 with the sixth or reverse drive gear 96 provides a reverse rotation of the output shaft 32 relative to the input shaft 31.

The plurality of display buttons 21–28 of the shifting control 11 controls the selected gear ratio of the improved automatic transmission 10. A vehicle speed sensor 360 is connected by a connector 362 to the control system 13 for controlling the operation of the improved automatic transmission 10 as will be described hereinafter.

When an operator desires to place the vehicle in motion, the operator will activate one of the display button 21–27 of the shifting control 11. Typically, the operator will activate the display button 25 for a normal driving condition.

Figure 13:
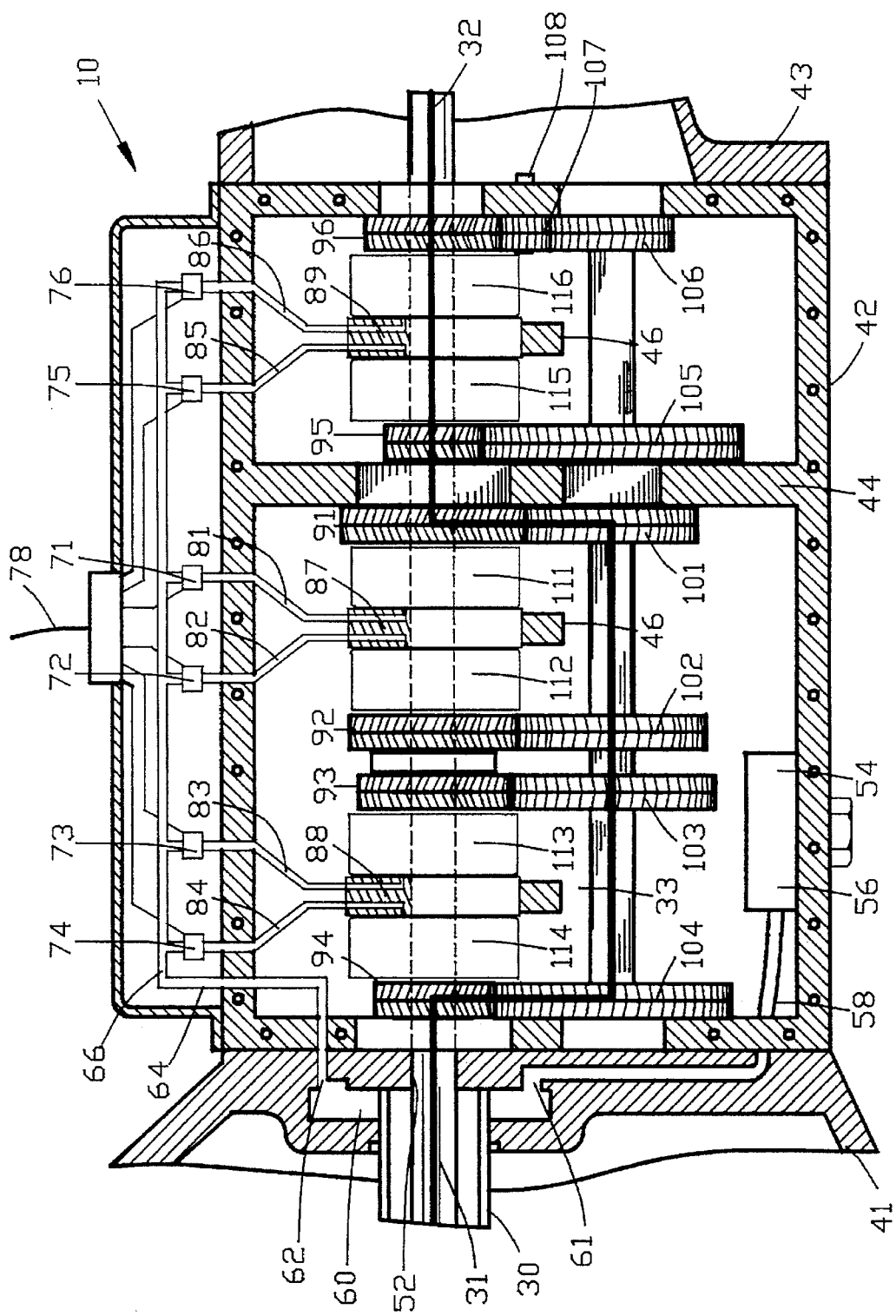
FIG. 13 is sectional view similar to FIG. 2 illustrating the engagement of a first gear ratio of the improved automatic transmission.

FIG. 13 is sectional view similar to FIG. 2 illustrating the engagement of a first gear ratio of the improved automatic transmission 10. Upon activation of the display button 25, the control system 13 opens the electrically operated valve 71 to allow hydraulic fluid to be pumped from the input 56 of the fluid line 58 by the hydraulic pump 60 and through the manifold 66 to flow through the fluid conduit 81 to engage clutch 111 enabling the first drive gear 91 to rotate the output shaft 32. The power flow path extends from the fourth or input drive gear 94 through the fourth countershaft gear 104 to the first countershaft gear 101 to the first drive gear 91. The engagement of the clutch 111 transfers power from the first drive gear 91 to the output shaft 32. The power flow path is shown by the bold line in FIG. 13.

The control system 13 monitors the throttle control sensor 12 and the vehicle speed sensor 360 for determining the preferred speed of shifting the improved automatic transmission 10. When the control system 13 senses the preferred speed for shifting, the control system 13 shifts the improved automatic transmission 10 to a second gear ratio.

Figure 14:
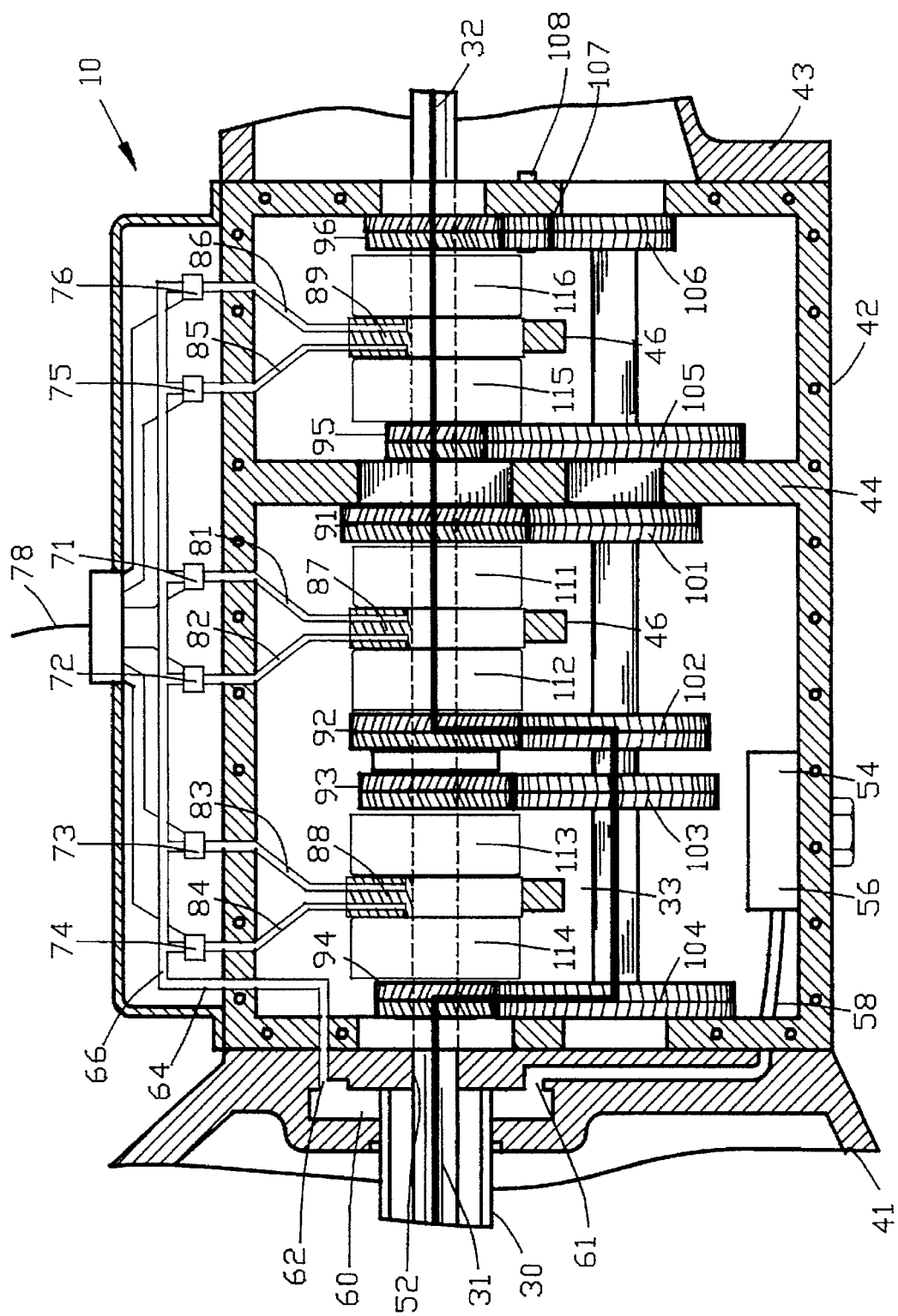
FIG. 14 is sectional view similar to FIG. 2 illustrating the engagement of a second gear ratio of the improved automatic transmission.

FIG. 14 is sectional view similar to FIG. 2 illustrating the engagement of the second gear ratio of the improved automatic transmission 10. The control system 13 closes the electrically operated valve 71 and opens the electrically operated valve 72 to allow hydraulic fluid to be pumped from the manifold 66 to flow through the fluid conduit 82 to engage clutch 112 enabling the second drive gear 92 to rotate the output shaft 32. The power flow path extends from the fourth or input drive gear 94 through the fourth countershaft gear 104 to the second countershaft gear 102 to the second drive gear 92. The engagement of the clutch 112 transfers power from the second drive gear 92 to the output shaft 32. The power flow path is shown by the bold line in FIG. 14.

Figure 15:
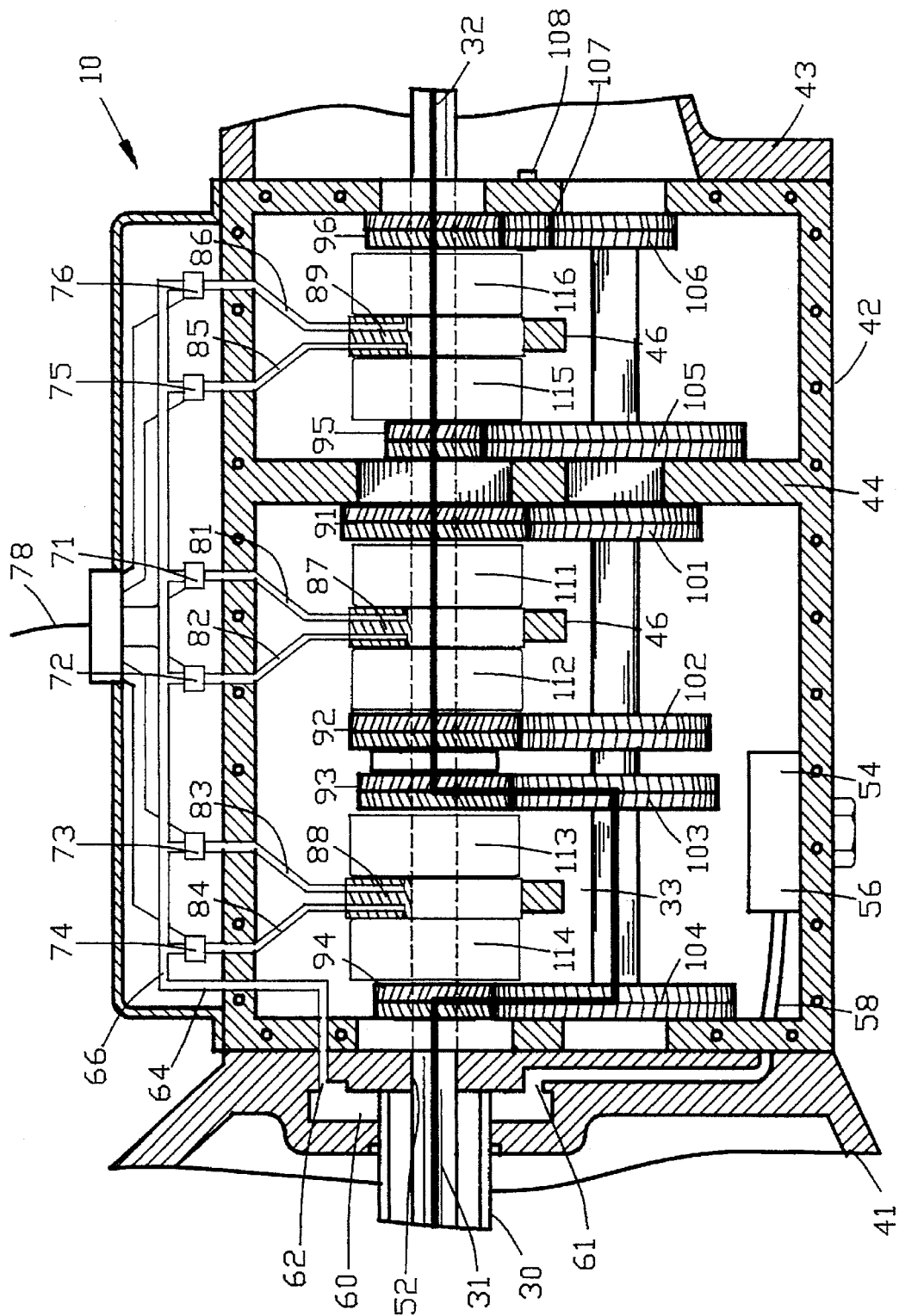
FIG. 15 is sectional view similar to FIG. 2 illustrating the engagement of a third gear ratio of the improved automatic transmission.

FIG. 15 is sectional view similar to FIG. 2 illustrating the engagement of the third gear ratio of the improved automatic transmission 10. The control system 13 closes the electrically operated valve 72 and opens the electrically operated valve 73 to allow hydraulic fluid to be pumped from the manifold 66 to flow through the fluid conduit 83 to engage clutch 113 enabling the third drive gear 93 to rotate the output shaft 32. The power flow path extends from the fourth or input drive gear 94 through the fourth countershaft gear 104 to the third countershaft gear 103 to the third drive gear 93. The engagement of the clutch 113 transfers power from the third drive gear 93 to the output shaft 32. The power flow path is shown by the bold line in FIG. 15.

Figure 16:
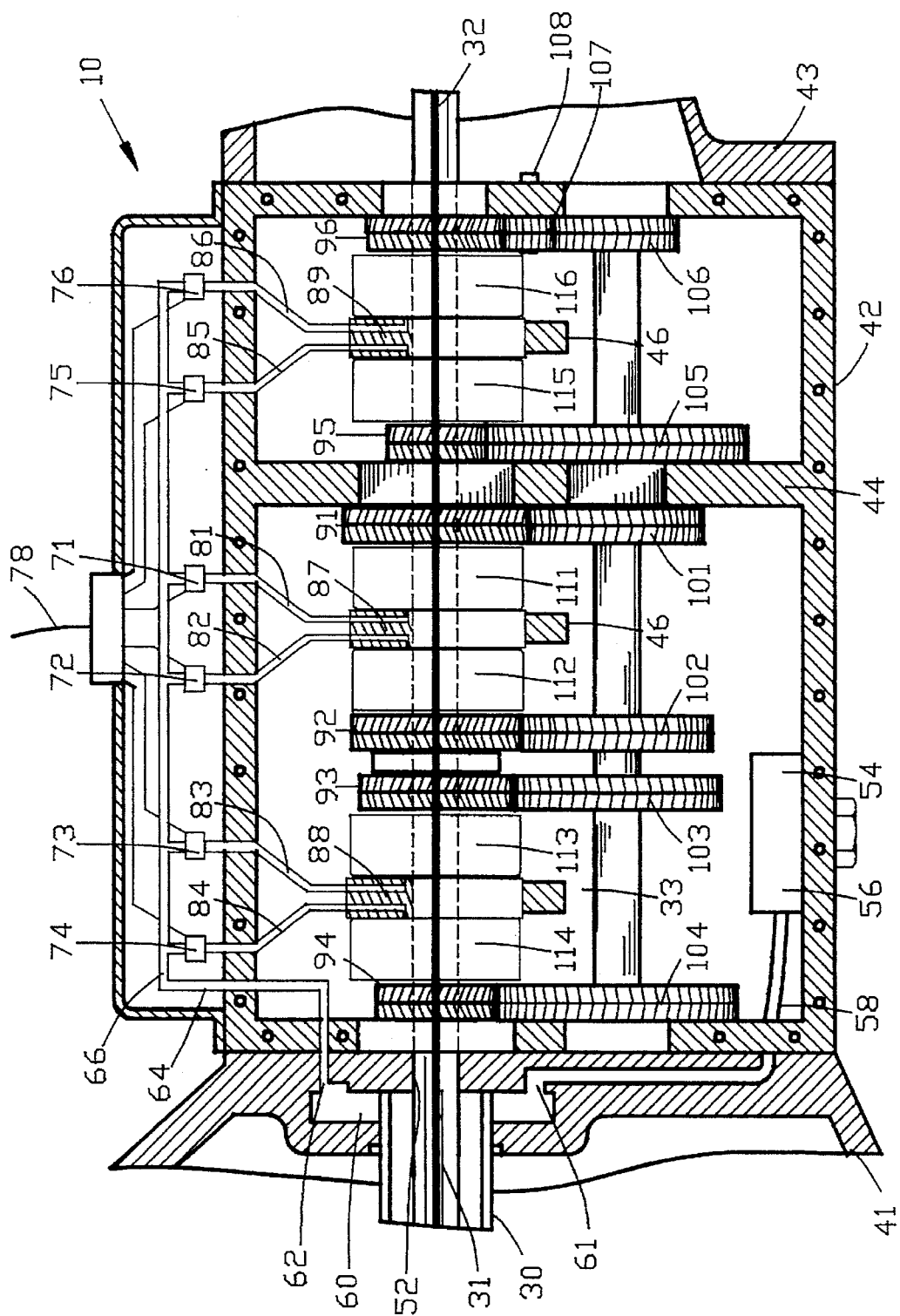
FIG. 16 is sectional view similar to FIG. 2 illustrating the engagement of a fourth gear ratio of the improved automatic transmission.

FIG. 16 is sectional view similar to FIG. 2 illustrating the engagement of the fourth gear ratio of the improved automatic transmission 10. The control system 13 closes the electrically operated valve 73 and opens the electrically operated valve 74 to allow hydraulic fluid to be pumped from the manifold 66 to flow through the fluid conduit 84 to engage clutch 114 enabling the fourth drive gear 93 to rotate the output shaft 32. The power flow path extends through the fourth or input drive gear 94. The engagement of the clutch 114 transfers power from the fourth drive gear 94 directly to the output shaft 32. The power flow path is shown by the bold line in FIG. 16.

Figure 17:
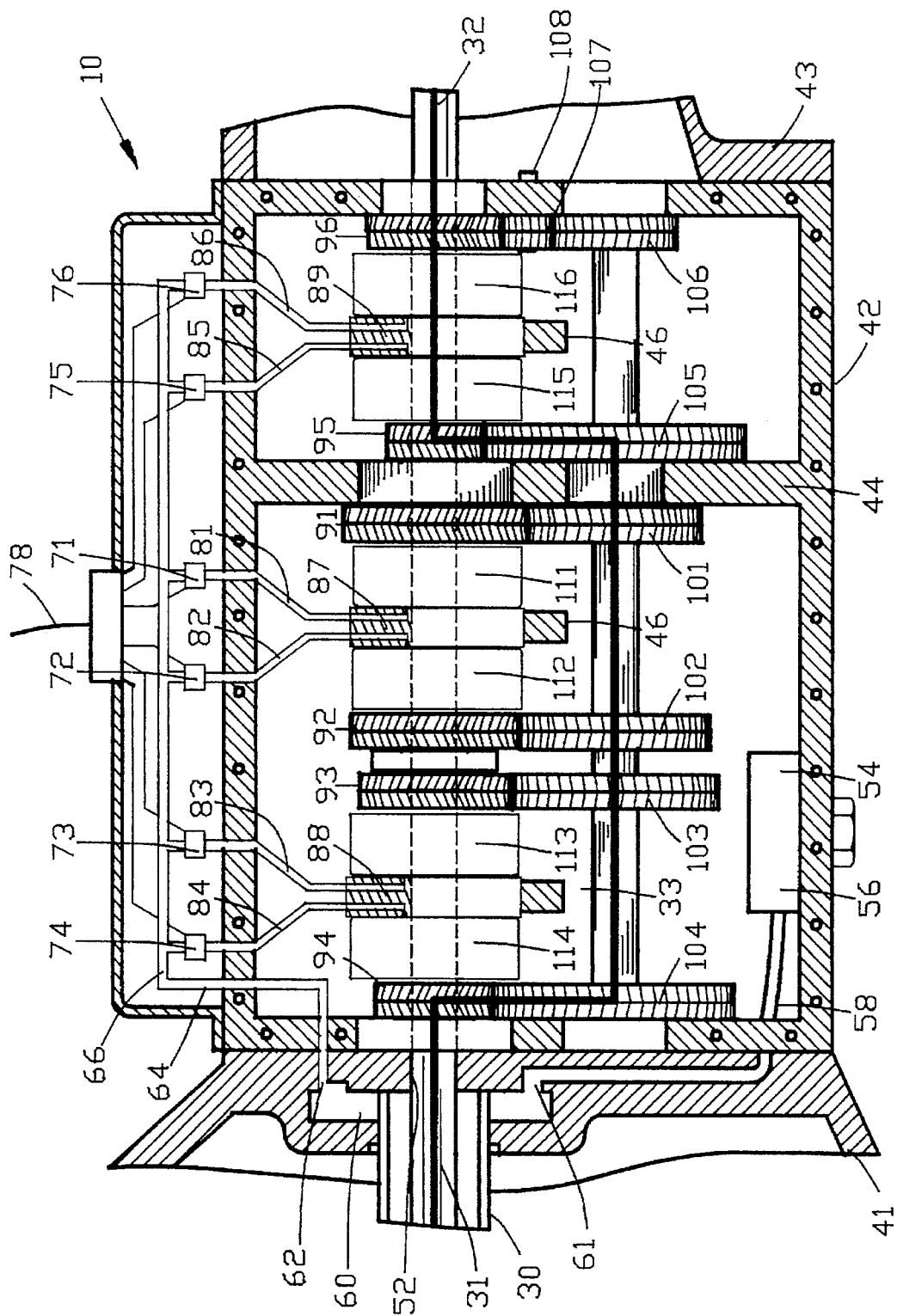
FIG. 17 is sectional view similar to FIG. 2 illustrating the engagement of a fifth gear ratio of the improved automatic transmission.

FIG. 17 is sectional view similar to FIG. 2 illustrating the engagement of the fifth gear ratio of the improved automatic transmission 10. The control system 13 closes the electrically operated valve 74 and opens the electrically operated valve 75 to allow hydraulic fluid to be pumped from the manifold 66 to flow through the fluid conduit 85 to engage clutch 115 enabling the fifth drive gear 95 to rotate the output shaft 32. The power flow path extends from the fourth or input drive gear 94 through the fourth countershaft gear 104 to the fifth countershaft gear 105 to the fifth drive gear 95. The engagement of the clutch 115 transfers power from the fifth drive gear 95 to the output shaft 32. The power flow path is shown by the bold line in FIG. 17.

Figure 18:
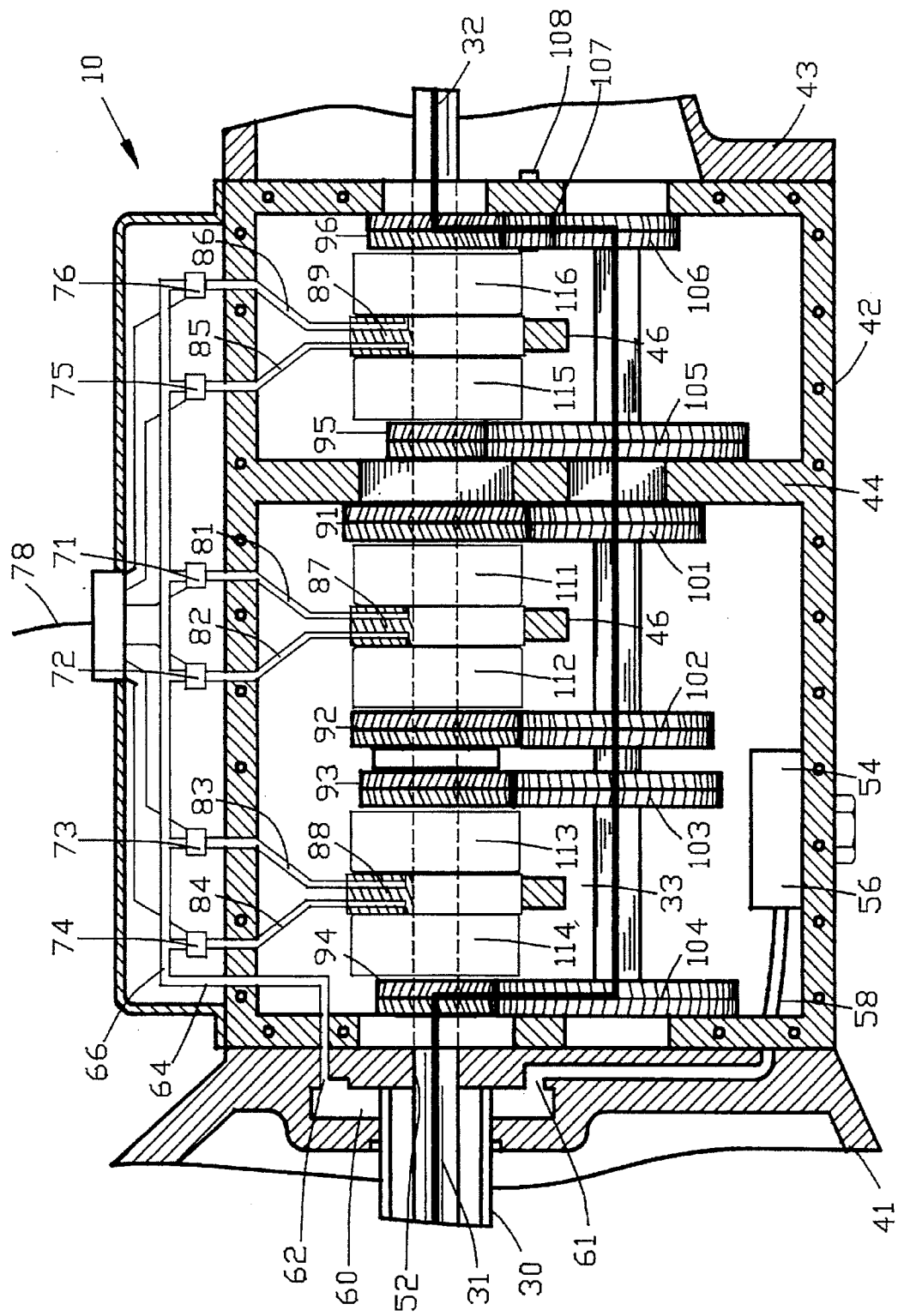
FIG. 18 is sectional view similar to FIG. 2 illustrating the engagement of a reverse gear ratio of the improved automatic transmission.

FIG. 18 is sectional view similar to FIG. 2 illustrating the engagement of a reverse gear ratio of the improved automatic transmission 10. When an operator desires to place the vehicle in reverse motion, the operator will activate the display button 26 of the shifting control 11. The control system 13 opens the electrically operated valve 76 to allow hydraulic fluid to be pumped from the manifold 66 to flow through the fluid conduit 86 to engage clutch 116 enabling the sixth drive gear 96 to rotate the output shaft 32. The power flow path extends from the fourth or input drive gear 94 through the fourth countershaft gear 104 to the sixth countershaft gear 106 and the idler gear 107 to the sixth drive gear 96. The engagement of the clutch 116 transfers power from the sixth drive gear 96 to the output shaft 32. The power flow path is shown by the bold line in FIG. 18.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved automatic transmission for transferring rotational power from a rotary power input of a land vehicle and a rotary power output of a drive wheel of the land vehicle, comprising:

an input shaft connected to the rotary power input for receiving rotary power therefrom;

an output shaft connected to the rotary power output for transferring rotary power thereto;

an input drive gear secured to said input shaft;

first, second and third drive gears rotatably mounted to said output shaft;

a countershaft having a countershaft gear secured thereto for rotational engagement with said input drive gear of said input shaft for transferring rotational power from said input shaft to said countershaft;

first, second and third countershaft gears secured to said countershaft for rotational engagement with said first, second and third drive gears of said output shaft for transferring rotational power from said countershaft to said first, second and third drive gears, respectively;

first, second and third clutches mounted between said output shaft and said first, second and third drive gears for transferring rotational power from a selected one of said first, second and third drive gears to said output shaft upon engagement of a selected one of said first, second and third clutches, respectively;

each of said first, second and third drive gears being connected to a clutch gear respectively disposed within said clutch housing;

each of said first, second and third clutches comprising a clutch housing secured to said output shaft;

each of said clutch housings having a peripheral region having a plurality of keyways;

a plurality of key rings located within each of said clutch housing with each of said plurality of key rings having a key located within said plurality of keyways for preventing rotation of said plurality of key rings relative to said clutch housing;

a plurality of gear rings located within said each of said clutch housing with each of said plurality of gear rings having gear teeth for engaging said clutch gear teeth of said clutch gear for preventing rotation of said plurality of gear rings relative to said drive gears;

said plurality of key rings being interleaved with said plurality of gear rings for enabling said plurality of key rings to rotate relative to said plurality of gear rings;

a clutch piston slidably disposed within each of said clutch housings for preventing rotation of said plurality of key rings relative to said plurality of gear rings upon an introduction of fluid pressure within said clutch housing;

a control for selectively introducing fluid pressure within one of said first, second and third clutches for transferring rotational power from said input shaft to said output shaft in accordance with said selected one of said first, second and third drive gears;

a park assembly comprising a park gear having a plurality of voids secured to said output shaft;

a blocking member pivotably mounted for movement between a non-interrupting position whereat said blocking member is positioned remote from one of said plurality of voids to enable rotation of said output shaft and an interrupting position whereat said blocking member is positioned within one of said plurality of voids to inhibit rotation of said output shaft;

said blocking member being biased into said non-interrupting position;

a stem slidably mounted in a direction parallel to said output shaft;

bar actuator being slidably mounted on said stem with a spring biasing said bar actuator into an extending position;

an electrical actuator connected to said control system for slidably moving said stem in accordance with a signal from said control system;

said control system actuating said electrical actuator to slidably move said stem for enabling said bar actuator to pivot said blocking member into one of said plurality of voids of said park gear for inhibiting rotation of said output shaft;

said bar actuator pivoting said blocking member into engagement with a surface of said park gear upon a misalignment of said blocking member with one of said plurality of voids of said park gear; and said bar actuator pivoting said blocking member into one of said plurality of voids of said park gear upon a slight rotation of said output shaft due to a slight movement of said vehicle for inhibiting rotation of said output shaft.

2. An improved automatic transmission as set forth in claim 1, wherein said first, second and third countershaft gears in rotational engagement with said first, second and third drive gears provide a first, second and a third gear ratio between said input shaft and said output shaft.

3. An improved automatic transmission as set forth in claim 1, wherein said control for sequentially engaging said first, second and third clutches for sequentially transferring rotational power from said input shaft to said output shaft in accordance with said first, second and third drive gears.

4. An improved automatic transmission as set forth in claim 1, including a reverse drive gear rotatably mounted to said output shaft;

a reverse countershaft gear secured to said countershaft for rotational engagement with said reverse drive gear of said output shaft for transferring reverse rotational power from said countershaft to said reverse drive gear; and a reverse clutch mounted between said output shaft and said reverse drive gear for transferring reverse rotational power from said input shaft to said output shaft upon engagement of said reverse clutches.

5. An improved automatic transmission as set forth in claim 1, including fourth and fifth drive gears rotatably mounted to said output shaft;

fourth and fifth countershaft gears secured to said countershaft for rotational engagement with said fourth and fifth drive gears of said output shaft for transferring rotational power from said countershaft to said fourth and fifth drive gears, respectively; and fourth and fifth clutches mounted between said output shaft and said fourth and fifth drive gears for transferring rotational power from said input shaft to said output shaft upon engagement of said fourth and fifth clutches, respectively.

6. An improved automatic transmission as set forth in claim 1, including a housing for containing said input shaft, said output shaft and said countershaft; and said housing comprising a first and a second housing portion with said first housing portion having input shaft journals, output shaft journals and countershaft journals for respectively journalling said input shaft, said output shaft and said countershaft.

7. An improved automatic transmission as set forth in claim 1, wherein each of said first, second and third drive gears include plural oppositely opposed gear teeth; and each of said first, second and third countershaft gears includes plural oppositely opposed gear teeth for engaging with plural oppositely opposed gear teeth of said first, second and third drive gears, respectively, for eliminating backlash between said first, second and third drive gears and said first, second and third countershaft gears.

8. An improved automatic transmission as set forth in claim 1, wherein said electrical actuator comprises a rotary actuator for rotating a worm gear in accordance with a signal from said control system;

said worm gear engaging teeth defined in a first end of a pivot actuator; and said stem being pivotably mounted to a second end of said pivot actuator.

* * * * *